United States Patent
Sakamoto et al.

[11] Patent Number: 5,483,846
[45] Date of Patent: Jan. 16, 1996

[54] IMPACT SENSING APPARATUS

[75] Inventors: Kazunori Sakamoto; Tateki Kawamura; Yutaka Kondoh, all of Aichi, Japan

[73] Assignee: Aisin Seiki Kabushiki Kaisha, Kariya, Japan

[21] Appl. No.: 143,882

[22] Filed: Nov. 1, 1993

[51] Int. Cl.⁶ .................. B60R 21/32; F42C 15/24
[52] U.S. Cl. .................. 74/2; 102/252; 180/282; 280/734
[58] Field of Search ............... 280/734, 806; 180/282; 74/2; 102/252; 137/45, 46

[56] References Cited

U.S. PATENT DOCUMENTS

| | | | |
|---|---|---|---|
| 4,573,706 | 3/1986 | Breed | 280/734 |
| 4,889,068 | 12/1989 | Tabata et al. | |
| 4,927,172 | 5/1990 | Motozawa | 280/734 |
| 5,024,157 | 6/1991 | Nishikawa | |
| 5,080,394 | 1/1992 | Mori et al. | 280/734 |
| 5,142,922 | 9/1992 | Sakamoto et al. | |
| 5,193,407 | 3/1993 | Sakamoto et al. | |

FOREIGN PATENT DOCUMENTS

| | | | |
|---|---|---|---|
| 2559584 | 8/1985 | France | |
| 60-248455 | 12/1985 | Japan | |
| 2-76557 | 6/1990 | Japan | |
| 2-115056 | 9/1990 | Japan | |
| 3-45354 | 4/1991 | Japan | |
| 6135297A | 5/1994 | Japan | 280/734 |
| 2274575 | 3/1994 | United Kingdom | 280/806 |

*Primary Examiner*—Rodney H. Bonck
*Assistant Examiner*—Troy Grabow
*Attorney, Agent, or Firm*—Finnegan, Henderson, Farabow, Garrett and Dunner

[57] ABSTRACT

An impact sensing apparatus includes a container, a weight swingably supported in the container and which is swung by an impact exceeding a predetermined value, an output member rotatably supported in the container and which engages the weight, the output member disengages the weight by the swing movement of the weight. A spring member is disposed between the container and the output member, which biases the output member so as to be rotated, and urges the weight so as not to swing. The weight includes a stopper portion for contacting the container so as to hold the weight at an initial position. The stopper portion is disposed at an outside edge of the weight and spaced from the pivotal axis of the weight so that the spring member presses against the container in an upwardly direction substantially vertical to a surface of the container.

8 Claims, 5 Drawing Sheets

IMPACT SENSING APPARATUS

BACKGROUND OF THE INVENTION

1. Field of the Invention

This invention relates to an impact sensing apparatus; and more particularly to an apparatus used as a sensor for starting the operation of a safety system such as an airbag or seat-belt tensioner to protect against impact.

2. Description of the Related Art

A conventional impact sensing apparatus used as a sensor for starting the operation of a safety system is disclosed in the U.S. Pat. No. 5,142,922. The impact sensing apparatus disclosed in the prior art comprises a housing and a pair of circular-shaped weights which are swingably supported in the housing. A firing lever, which engages the weights, is rotatably supported in the housing, and a spring member is disposed between the housing and the firing lever for rotating the firing lever by its elastic force. The spring member holds the weights against swing movement at the initial position where the outside of the weights are in contact with the housing. In accordance with the structure of the above impact sensing apparatus, the firing lever disengages the weights by the swing movement of the weight when an impact, exceeding a predetermined value, is applied to the impact sensing apparatus. Thus, the firing lever is rotated by the elastic force of the spring member, and the safety system is operated.

A related art of an impact sensing apparatus used as a sensor for starting the operation of a safety system is disclosed in the U.S. Pat. No. 5,193,407 issued on Mar. 16, 1993. The impact sensing apparatus disclosed in the related art comprises a housing on which a plate is fixed. A circular-shaped weight is rotatably and slidably supported in the housing. A firing lever, which engages the weight, is rotatably supported in the housing, and a spring member is disposed between the housing and the firing lever for rotating the firing lever by its elastic force. The spring member holds the weight against its rotational and sliding movement from its initial position where a stopper pin, mounted on the weight, contacts the plate. In accordance with the structure of the above impact sensing apparatus, the firing lever is disengaged from the weight by the rotational and sliding movement of the weight when an impact, exceeding a predetermined value, is applied to the impact sensing apparatus. This permits the firing lever to be rotated by the elastic force of the spring member, and the safety system is operated.

However, in accordance with the first impact sensing apparatus mentioned above, because the weights are held by the spring member against swing movement at their initial position where the outside of the circular-shaped weights are in contact with the housing, each of the portions of the weights in contact with the housing are adjacent to each of the swingable center points of the weights; and the elastic force of the spring member is applied to each of the contact portions in a direction parallel to one wall of the housing. Therefore, minute deformation of the housing generated by the contacts of the weights with the housing, increase the frictional force between the weights and the housing. Consequently, because the weights adhere to the housing, the impact sensing apparatus cannot operate smoothly, even though an impact exceeding a predetermined value, is applied to the impact sensing apparatus.

In accordance with the second impact sensing apparatus mentioned above, the initial position of the weight varies either because of the dislocation of the stopper pin at a predetermined position, or the deformation of the stopper pin by stress occurring at the contact portion of the stopper pin and the plate. Therefore, the firing lever of the impact sensing apparatus sometimes does not completely engage the weight.

Additional art related to the impact sensing apparatus used as a sensor for starting the operation of a safety system is disclosed in the Japanese Patent Laid Open No. 60(1985)-248455. The impact sensing apparatus disclosed comprises a housing, a sensing mechanism disposed in the housing for starting the operation of the safety system upon an impact exceeding a predetermined value, and a safety mechanism is disposed in the housing for preventing the sensing mechanism from inadvertently operating before the impact sensing apparatus is mounted on an assembly, such as a steering mechanism of a vehicle.

In accordance with the above apparatus, when an impact exceeding a predetermined value is applied to the impact sensing apparatus, weights of the sensing mechanism are moved by the impact. Firing levers of the sensing mechanism are rotated by the weights, which force one end of each of the firing levers. Therefore, firing pins of the sensing mechanism disengage cam portions, each of which are disposed on the firing levers. The firing pins are projected out of the housing by the elastic force of spring members of the sensing mechanism for igniting a pyrotechnic element such as a primer. Consequently, the safety system is operated.

The structure and the operation of the safety mechanism will be described hereinafter. Before the impact sensing apparatus is mounted on the assembly, such as a vehicle, lock arms of the safety mechanism, forced by spring members, engage the weights and prevent the weights from moving. When the impact sensing apparatus is mounted on the assembly, a lock pin disposed on the assembly is inserted into the safety mechanism, and each of the lock arms is turned because of the engagement between each of the lock arms and the lock pin. Therefore each of the weights are disengaged from the lock arms, and the weights are permitted to move. That is to say, before the impact sensing apparatus is mounted on the assembly, the operation of the sensing mechanism is restrained by restricting the movement of the weights. When the impact sensing apparatus is mounted on the assembly, the operation of the sensing mechanism is permitted because the weights are free to move. Therefore, the inadvertent operation of the impact sensing apparatus is prevented before the impact sensing apparatus is mounted on the assembly.

However, in accordance with the above structure, because each of the lock arms is turned by the lock pin, which engages the lock arms, the impact sensing apparatus requires the precise location of the lock arms relative to the lock pin so that the lock arms may completely engage and disengage the weights. Therefore, the impact sensing apparatus is inconvenient, which increases the cost.

SUMMARY OF THE PRESENT INVENTION

It is an object of the present invention to provide an improved impact sensing apparatus which can operate smoothly when an impact exceeding a predetermined value is applied to the impact sensing apparatus.

It is another object of the present invention to provide an improved impact sensing apparatus which can precisely locate a weight at a predetermined initial position.

It is a further object of the present invention to provide an improved impact sensing apparatus which prevents the inadvertent operation thereof.

It is a further object of the present invention to provide an improved impact sensing apparatus which is simple in structure.

It is a further object of the present invention to provide an improved impact sensing apparatus which is suitable for any kind of safety system.

It is a further object of the present invention to provide an improved impact sensing apparatus which is small in size.

It is a further object of the present invention to provide an improved impact sensing apparatus which is low in cost.

To achieve the above mentioned objects, an impact sensing apparatus in accordance with this invention comprises a container, a weight swingably supported in the container, and which is swung by an impact exceeding a predetermined value. An output member is rotatably supported in the container, and engages the weight. The output member disengages the weight by the pivotal movement of the weight; and a spring member, disposed between the container and the output member, rotatably biases the output member. The spring member also keeps the weight from swinging. The weight includes a stopper portion for contacting the container, so as to hold the weight at an initial position, which is disposed at the outside thereof; and which is spaced from the pivotal axis of the weight so that the spring member presses against the container in a substantially vertical direction relative to a surface of the container.

BRIEF DESCRIPTION OF THE DRAWINGS

The features and advantages of the impact sensing apparatus according to the present invention will be more clearly appreciated from the following description in conjunction with the accompanying drawings wherein.

DETAILED DESCRIPTION OF PREFERRED EMBODIMENT

Figure 1:
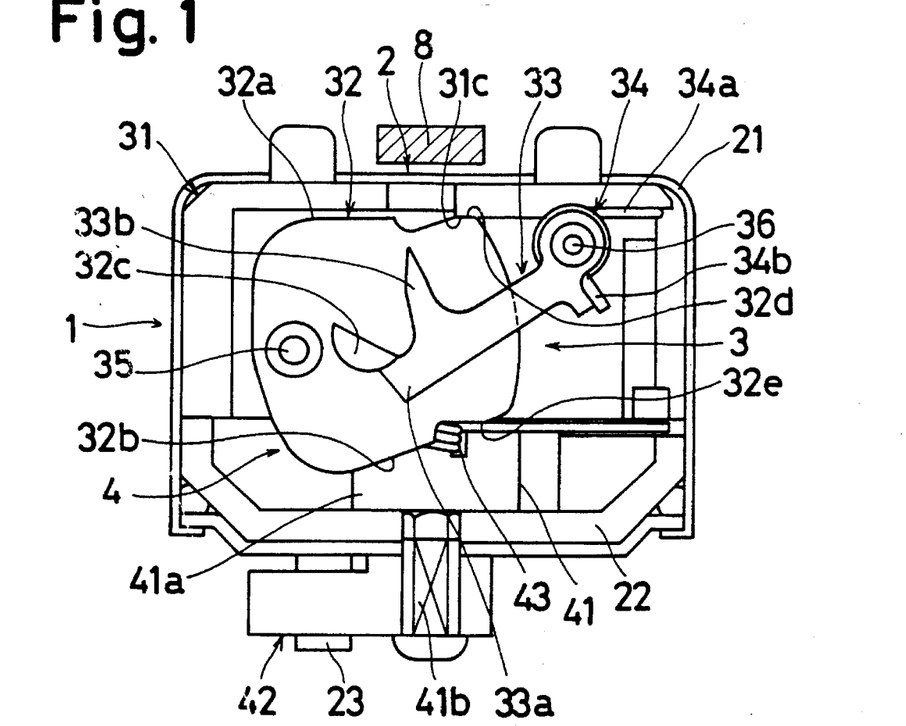
FIG. 1 is an elevational view of an impact sensing apparatus in accordance with one embodiment of the present invention before a safety mechanism is released.
Figure 3:
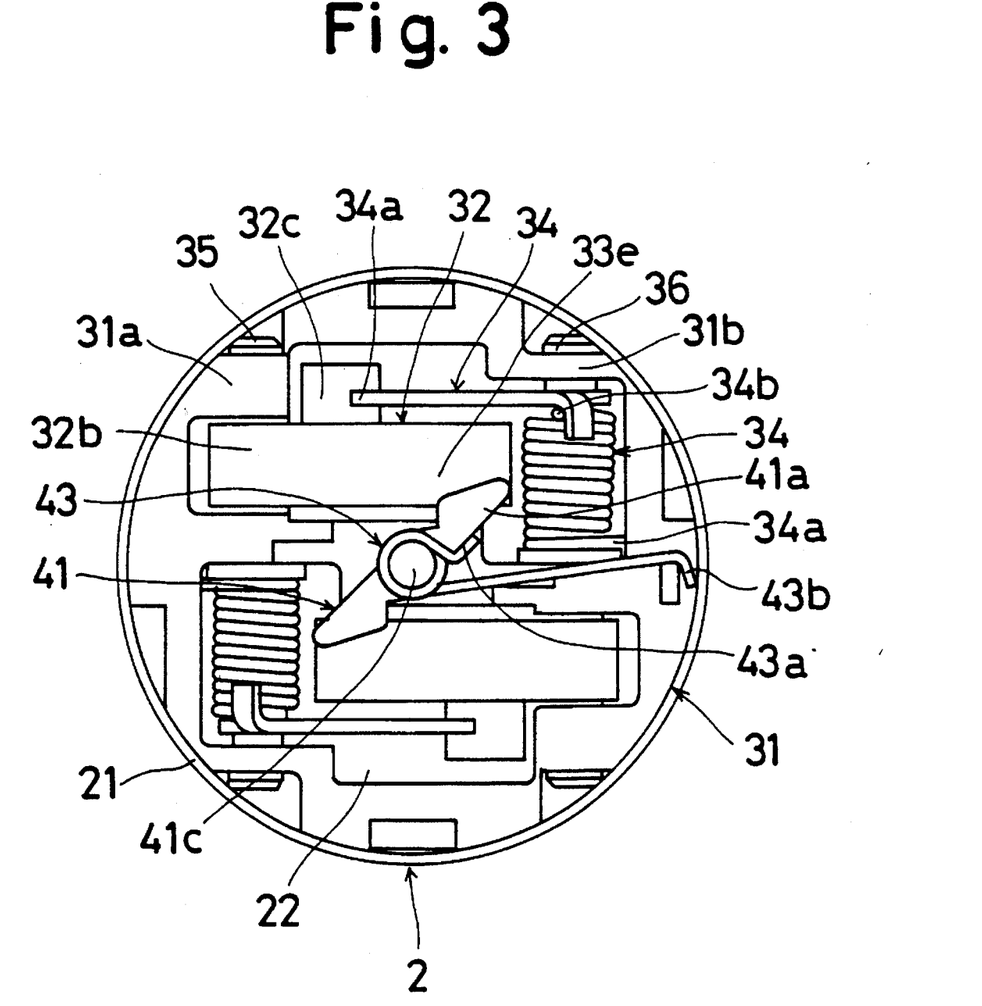
FIG 3 is a top plan view of the impact sensing apparatus of FIG. 1.

Referring to FIGS. 1 and 3, an impact sensing apparatus 1 comprises a housing 2 forming a container, a sensing mechanism 3 disposed in the housing 2, and a safety mechanism 4 disposed in the housing 2. The housing 2 is formed with a casing 21, a cover 22 with a space between the casing 21 and the cover 22, in which the sensing mechanism 3 and the safety mechanism 4 are contained.

The sensing mechanism 3 includes a frame 31 defining the container, a pair of weights 32, a pair of firing levers 33 and a pair of springs 34. The frame 31 has supporting portions 31a and 31b fixed on the casing 21, each of which supports the weights 32 and the firing levers 33, respectively. The frame 31 includes a flat surface portion 31c which contacts the weights 32.

Each of the weights 32 has a rectangular configuration in cross-section which includes planes 32a and 32b. The weight 32 is swingably mounted on the supporting portion 31a of the frame 31 at a position which is offset from a center of gravity of the weight 32 by a pivot pin 35. A semicircular cam portion 32c which engages and disengages the firing lever 33 is formed on the weight 32. Further, a stopper portion 32d of the weight 32 which contacts the flat surface portion 31c of the frame 31 is formed on the plane 32a of the weight. The plane 32b has an engaging surface 32e, which engages and disengages a lock cam 41 (described later) of the safety mechanism 4. An initial position of the weight 32 is determined by the contact of the flat surface portion 31c of the frame 31 and the stopper portion 32d of the weight.

Figure 8:
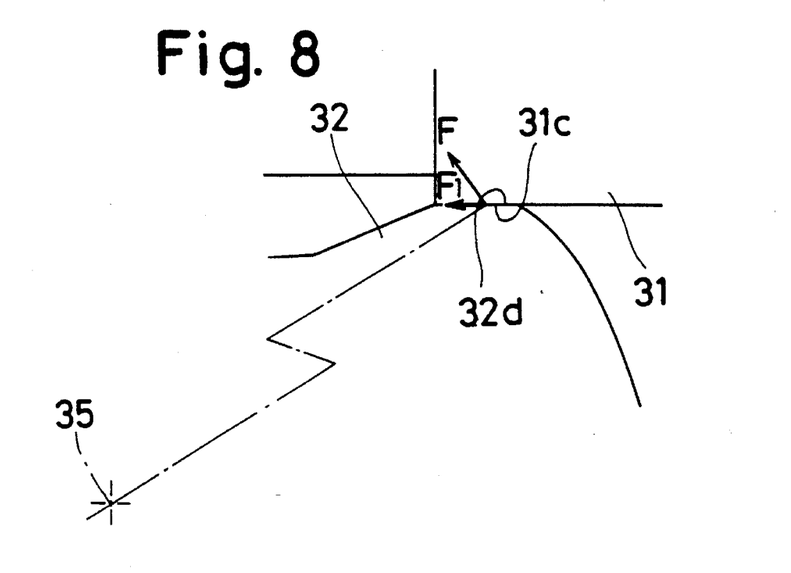
FIG. 8 is an enlarged elevational view of a portion of an impact sensing apparatus in accordance with the present invention.

The stopper portion 32d is an integral flat surface portion of the plane 32a of the weight 32 spaced a substantial distance from the pivotal axis (pin 35) of the weight 32. As shown in FIG. 8, an elastic force F of a spring member 34 (described later) operates at the contact portion of the stopper portion 32d and the flat surface portion 31c in the substantially vertical direction of the stopper portion 32d and the flat surface portion 31c. Therefore a component F1 in the horizontal direction of the elastic force F, that is to say, the frictional force between the stopper portion 32d and the flat surface portion 31c generated by minute deformation of the flat surface portion 31c is reduced, because of the contact of the stopper portion 32d and the flat surface portion 31c. Consequently, the weight 32 does not adhere to the frame 31.

A firing lever 33 is rotatably supported on the supporting portions 31b by a pin 36 in the cantilever style. The firing lever 33 includes an engaging portion 33a which engages the cam portion 32c of the weight 32 at the tip thereof. The firing lever 33 comprises a firing pin 33b which strikes a primer 8 of a safety system for the impact (not shown) with rotational movement thereof. With the swing movement of the weight 32, the cam portion 32c of the weight 32 engages or disengages the engaging portion 33a of the firing lever 33. The rotational movement of the firing lever 33 is restrained by the engagement of the cam portion 32c with the engaging portion 33a, and the firing pin 33b is contained within the housing 2. The spring member 34 is wound about the pin 36. One end 34a of the spring member 34 is fixed to the frame 31, and the other end 34b of the spring member 34 is in engagement with the firing lever 33. In accordance with the structure, the spring member 34 urges the firing lever 33 to rotate in the direction where the firing pin 33b projects out the housing 2. Simultaneously, the spring member 34 holds the weight 32 so as to prevent the movement of the weight 32 by engagement of the cam portion 32c with the engaging portion 33a.

Because the stopper portion 32d is integrally formed on the plane 32a of the weight 32, the stopper portion 32d is not offset from the weight 32, and the stopper portion 32d is precisely located at a predetermined position. Therefore, the weight 32 is precisely set at the proper initial position, and the cam portion 32c is in a certain and complete engagement with the engaging portion 33a.

Figure 2:
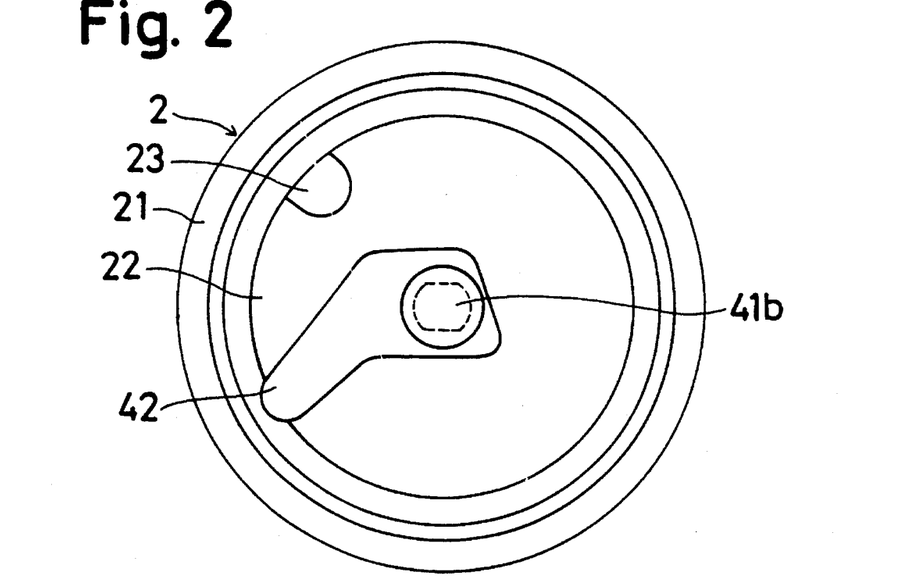
FIG. 2 is a bottom view of the impact sensing apparatus of FIG. 1.

The safety mechanism 4 includes the lock cam 41, a lock lever 42, and a spring 43. The lock cam 41 has a pair of integral engaging portions 41a and axial portions 41b and 41c. The lock cam 41 is rotatably mounted on the cover 22 of the housing 2 with the axial portion 41b so that each of the engaging portions 41a is selectively located at an engaging position where each of the engaging portions 41a is set in the trace of the swing movement of the weight 32; or a release position, where each of the engaging portions 41a is set out of the trace of the swing movement of the weight 32. The axial portion 41b extends out the housing 2 through the cover 22. The lock lever 42 is fixed to a cut portion (similar to the oval shape in section shown in FIG. 2) of the axial portion 41b so as to be rotated with the lock cam 41. The spring 43 is wound about the axial portion 41c. One end 43a of the spring 43 engages the lock cam 41, and the other end 43b is fixed to the frame 31. The spring 43 constantly urges the lock cam 41 to locate the lock cam 41 at the engaging position where the engaging portions 41a are set in the trace of the swing movement of the weight 32. Further a stopper member 23 is integrally provided on the cover 22. The stopper member 23 is located in the trace of the rotational movement of the lock lever 42. Therefore, when each of the engaging portions 41a is located in the release position, the stopper member 23 is in contact with the lock lever 42 so as to restrict the rotational angle of the lock lever 42.

The operation of the impact sensing apparatus will be described hereinafter. From FIGS. 1 to 3 the lock cam 41 is located in the engaging position where each of the engaging portions 41a is set in the trace of the swing movement of the weight 32 by the elastic force of the spring 43. Even though an impact exceeding a predetermined value is applied to the impact sensing apparatus 1, the weight 32 is prevented from moving by the engagement of the engaging portions 41a with the engaging surface 32e of the weight 32. Because the engaging surface 32e is parallel to the engaging portion 41a; and the engaging surface 32e is positioned a distance from the pin 35, which serves as the pivotal axis, the engaging surface 32e strictly engages with certainty the engaging portion 41a. Therefore, the inadvertent operation of the impact sensing apparatus 1 is prevented before the impact sensing apparatus 1 is mounted on the assembly such as a steering wheel of the vehicle.

Figure 5:
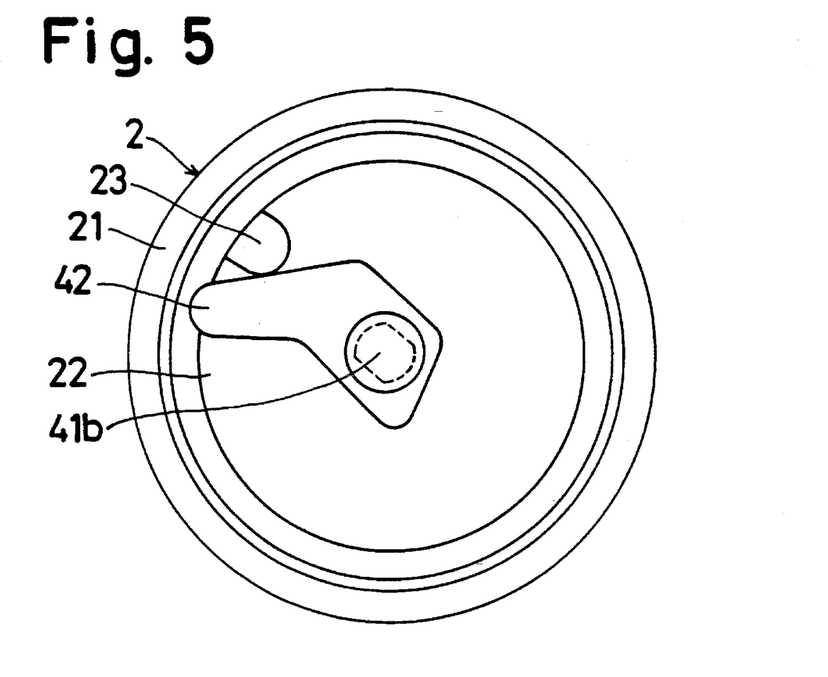
FIG. 5 is a bottom view of the impact sensing apparatus of FIG. 4.
Figure 6:
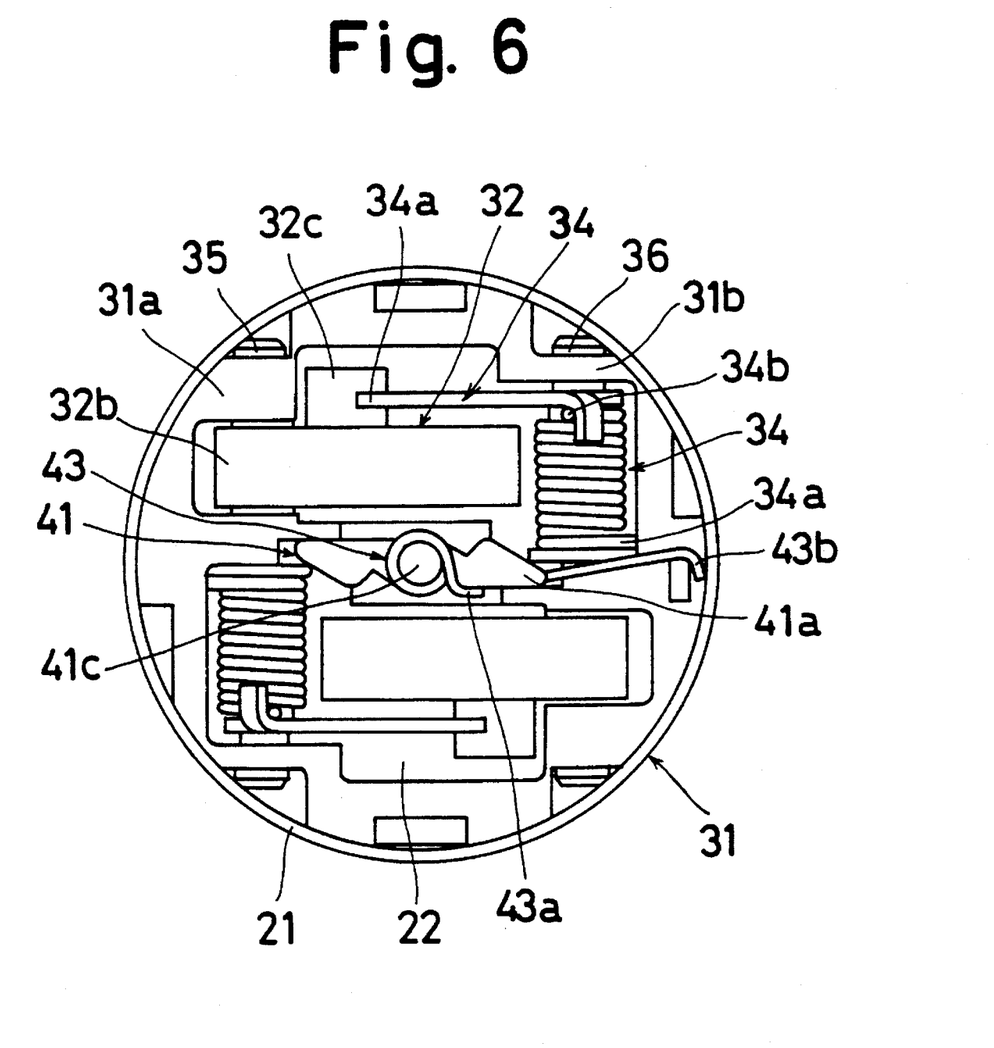
FIG 6 is a top plan view of an the impact sensing apparatus of FIG. 4.

When the lock lever 42 is rotated to contact the stopper member 23, the lock cam 41 is also rotated against the elastic force of the spring 43. Therefore, the lock cam 41 is located in the release position where each of the engaging portions 41a is set out the trace of the swing movement of the weight 32 as shown in from FIGS. 4 to 6. In this condition the weight 32 can be swingably moved by an impact exceeding a predetermined value because the engaging surface 32e is not in contact with the engaging portion 41a. After the impact sensing apparatus 1 is mounted on the assembly such as the steering wheel of the vehicle, the lock cam 41 is held at the release position against the elastic force of the spring 43 by a contact of the lock lever 42 with a member of the vehicle assembly. In accordance with the structure, because the lock cam 41 is engaged or disengaged with the weight 32 by the rotational movement of the lock lever 42, the lock lever 42 does not need to be precisely located at a predetermined position of the impact sensing apparatus 1 in relation to the lock cam 41. The lock cam 41 may be mounted integrally to the lock lever 42 so as to be precisely rotated with the lock lever 42. Further, because the rotational angle of the lock lever 42 is restricted by the stopper member 23, the damage of the sensing mechanism 3 and the safety mechanism 4, generated by the over stroke of the lock lever 42 is prevented. The stopper member 23 is integrally formed on the cover 22, and the lock lever 42 is mounted fixedly to the cover 22 through the axial portion 41b of the lock cam 41. Therefore, the stopper 23 is precisely and easily positioned at the proper location in relation to each of the lock cam 41 and the lock lever 42.

Figure 4:
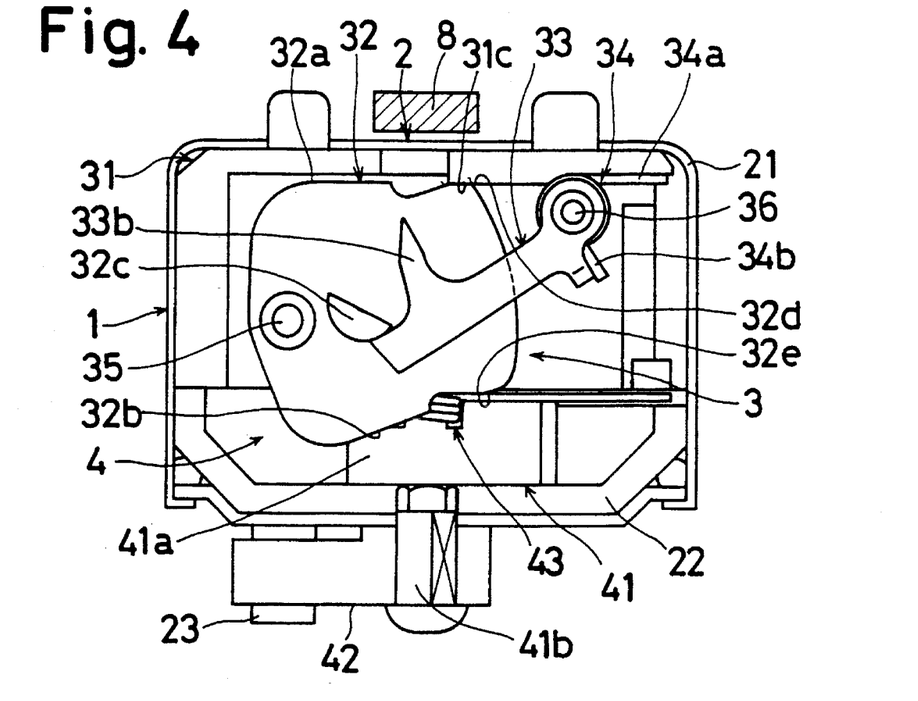
FIG. 4 is an elevational view of an impact sensing apparatus in accordance with one embodiment of the present invention after the safety mechanism is released.

In the initial condition shown in FIG. 4, the firing lever 33 is held by the weight 32 because of the engagement of the cam portion 32c and the engaging portion 33a against the elastic force of the spring member 34. The swing movement of the weight 32 is restrained by the elastic force of the spring member 34 through contact with the cam portion 32c and the engaging portion 33a. Further, the weight 32 is held at the initial position by the contact between the flat surface portion 31c and the stopper portion 32d.

Figure 7:
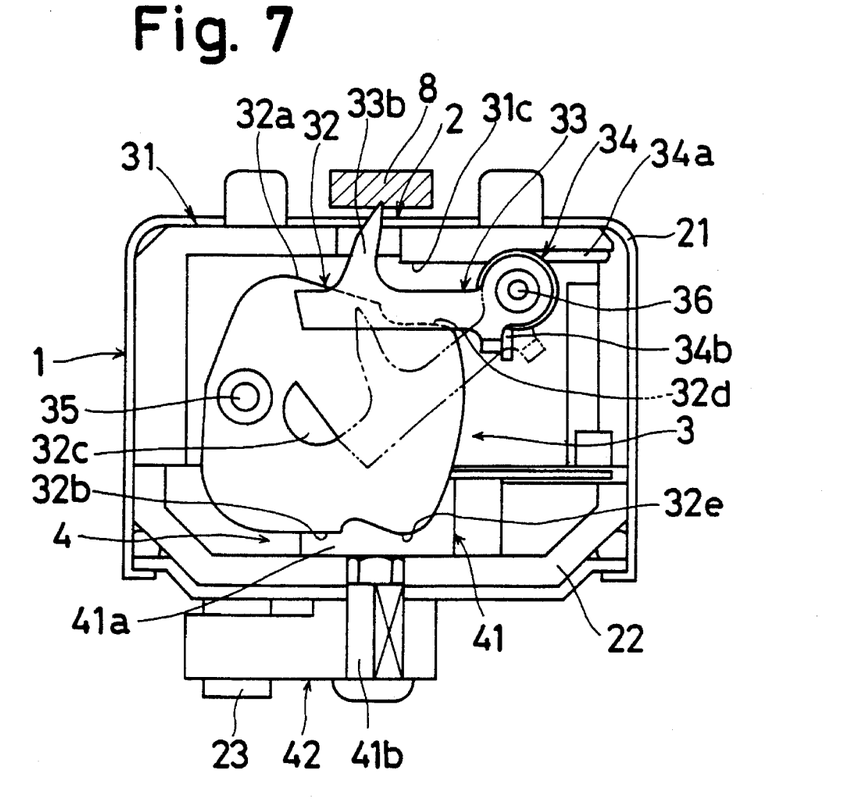
FIG. 7 is an elevational view of the impact sensing apparatus of FIG. 4 upon operation of the impact sensing apparatus.

When an impact exceeding a predetermined value (larger than the elastic force of the spring member 34) is applied to the impact sensing apparatus 1, the weight 32 is swung about the pin 35 opposing the elastic force of the spring member 34 as shown in FIG. 7. Because the pivot pin 35 is offset from the center of the gravity of the weight 32, an inertial moment of the weight 32 operates when the weight 32 is swung. Therefore, the weight 32 is not swung by an instantaneous impact, but swung by a continuous impact exceeding a predetermined value. In the structure above mentioned, the impact sensing apparatus 1 can certainly detect the impact to be detected. When the weight 32 is swung, the cam portion 32c disengages the engaging portion 33a by the rotational movement of the cam portion 32c. The firing lever 33 is turned about the pin 36 by the elastic force of the spring member 34 and the firing pin 34b projects out the housing 2 to strike the primer 8. Consequently the safety system for the impact is operated.

While the invention has been particularly shown and described with reference to preferred embodiment thereof, it will be understood by those skilled in the art that the foregoing and other changes in form and details can be made therein without departing from the spirit and scope of the invention.

What is claimed is:

1. An impact sensing apparatus comprising:
   a container;
   a weight swingably supported in the container to swing in a first direction about a pivotal axis n response to an impact exceeding a predetermined value;
   an output member rotatably supported in the container in engagement with the weight, the output member disengaging the weight upon the swinging of the weight a predetermined distance about said pivotal axis in said first direction;
   the weight having a perimetrical edge that includes a stopper portion in contact with a surface of an interior section of the container to hold the weight at an initial position;
   a spring member disposed between the container and the output member biasing the output member in a direction to disengage the weight upon the swinging of the weight said predetermined distance in the first direction, the spring member biasing the weight in a second direction via the output member urging the stopper portion of the weight against the surface of the interior section of the container to hold the weight in said initial position, the spring member and the pivotal axis and the stopper portion and the interior section being spaced from one another and oriented relative to one another to cause the spring member to press the stopper portion against the surface of the interior section of the container in a direction substantially perpendicular to the surface of the interior section of the container when the weight is held in said initial position lock lever rotatably disposed exteriorly of the container, and a lock cam rotatably supported in the container, the lock cam being connected to and rotatable with the lock lever to selectively engage and disengage the weight in response to rotation of the lock lever, the weight remaining fixed in the initial position upon disengagement of the lock cam from the weight.

2. An impact sensing apparatus as recited in claim 1, wherein the stopper portion is a flat surface.

3. An impact sensing apparatus as recited in claim 1, wherein the stopper portion is an integral part of the weight.

4. An impact sensing apparatus as recited in claim 1, further comprising a stopper member disposed exteriorly of the container, the stopper member being engageable with the lock lever to limit rotation of the lock lever when disengaging the weight.

5. An impact sensing apparatus as recited in claim 1, wherein the weight includes an engaging portion on the perimetrical edge and the lock cam engages the weight at the engaging portion and the lock cam being spaced from the pivotal axis of the weight.

6. An impact sensing apparatus, comprising
a container:
    a weight swingably supported in the container to swing in a first direction about a pivotal axis n response to an impact exceeding a predetermined value;
    an output member rotatably supported in the container in engagement with the weight, the output member disengaging the weight upon the swinging of the weight a predetermined distance about said pivotal axis in said first direction;
    the weight having a perimetrical edge that includes a stopper portion in contact with a surface of an interior section of the container to hold the weight at an initial position;
    a spring member disposed between the container and the output member biasing the output member in a direction to disengage the weight upon the swinging of the weight said predetermined distance in the first direction, the spring member biasing the weight in a second direction via the output member urging the stopper portion of the weight against the surface of the interior section of the container to hold the weight in said initial position, the spring member and the pivotal axis and the stopper portion and the interior section being spaced from one another and oriented relative to one another to cause the spring member to press the stopper portion against the surface of the interior section of the container in a direction substantially perpendicular to the surface of the interior section of the container when the weight is held in said initial position, a lock lever rotatably disposed exteriorly of the container; a lock cam rotatably supported in the container and engagable directly with the weight, the lock cam being connected to and rotatable with the lock lever when the lock cam is disengaged from the weight.

7. An impact sensing apparatus as recited in claim 6, further comprising a stopper member disposed exteriorly of the container, the stopper member engaging the lock lever so as to restrict a rotational angle of the lock lever.

8. An impact sensing apparatus as recited in claim 6, wherein the weight and the lock cam engage each other at a pair of engaging portions, each of the engaging portions being respectively disposed on the weight, and the lock cam being spaced from the pivotal axis of the weight, the engaging portions being parallel to each other.

* * * * *

UNITED STATES PATENT AND TRADEMARK OFFICE
CERTIFICATE OF CORRECTION

PATENT NO. : 5,483,846
DATED : January 16, 1996
INVENTOR(S) : Kazunori Sakamoto et al.

It is certified that error appears in the above-indentified patent and that said Letters Patent is hereby corrected as shown below:

Claim 1, column 6, line 45, change "n" to --in--.

Claim 1, column 7, line 4, before "lock" insert --, a--.

Claim 1, column 7, line 29, change "n" to --in--.

Signed and Sealed this

Sixth Day of August, 1996

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,483,846
DATED : January 16, 1996
INVENTOR(S) : Kazunori Sakamoto et al.

It is certified that error appears in the above-indentified patent and that said Letters Patent is hereby corrected as shown below:

Please add to the face page of patent on the next line following "[22]  Filed:  Aug. 14, 1996"

--[30]  Foreign Application Priority Data

Nov. 2, 1992    [JP]    Japan .......... 4-294593
    Nov. 2, 1992    [JP]    Japan .......... 4-294595
    Sept. 22, 1993  [JP]    Japan .......... 5-236645--

Signed and Sealed this

Fifth Day of May, 1998

Attest:

BRUCE LEHMAN

*Attesting Officer*    *Commissioner of Patents and Trademarks*